United States Patent
Freund et al.

(10) Patent No.: US 8,536,552 B2
(45) Date of Patent: Sep. 17, 2013

(54) COLLIMATOR FOR A RADIATION DETECTOR AND METHOD FOR MANUFACTURING SUCH A COLLIMATOR AS WELL AS METHOD FOR MANUFACTURING A RADIATION DETECTOR COMPRISING COLLIMATORS

(75) Inventors: Andreas Freund, Heroldsbach (DE); Claus Pohan, Baiersdorf (DE); Gottfried Tschöpa, Rednitzhembach (DE); Stefan Wirth, Erlangen (DE); Jan Wrege, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 106 days.

(21) Appl. No.: 13/304,781

(22) Filed: Nov. 28, 2011

(65) Prior Publication Data
US 2012/0132833 A1    May 31, 2012

(30) Foreign Application Priority Data
Nov. 29, 2010 (DE) .......................... 10 2010 062133

(51) Int. Cl.
*H01J 35/16* (2006.01)
*A61B 6/00* (2006.01)
*G21K 1/02* (2006.01)

(52) U.S. Cl.
USPC ................... 250/505.1; 250/397; 250/370.09; 378/147; 378/19; 378/98.9; 264/328.1

(58) Field of Classification Search
USPC ................ 250/505.1, 397, 370.09; 378/147, 378/19, 98.9; 264/328.1
See application file for complete search history.

(56) References Cited

U.S. PATENT DOCUMENTS

| | | | | |
|---|---|---|---|---|
| 4,672,648 | A | * | 6/1987 | Mattson et al. ................... 378/4 |
| 6,377,661 | B1 | * | 4/2002 | Guru et al. ..................... 378/149 |
| 2012/0132834 | A1 | * | 5/2012 | Freund et al. .............. 250/505.1 |

OTHER PUBLICATIONS

German Priority document for German Application No. DE 10 2010 062 133.1 filed Nov. 29, 2010 (Not Yet Published).

* cited by examiner

*Primary Examiner* — Nikita Wells
(74) *Attorney, Agent, or Firm* — Harness, Dickey & Pierce, P.L.C.

(57) ABSTRACT

A collimator is disclosed for a radiation detector including at least three spacing elements arranged on a radiation exit face of the collimator. In at least one embodiment, they are embodied so as to mount the collimator in a stable manner with respect to a radiation converter of the radiation detector. The at least three spacing elements enable a very precise and stable alignment of the collimator in respect of the radiation converter despite manufacturing-related curves or unevennesses in the radiation exit face and/or the mounting surface on the part of the radiation converter. At least one embodiment of the invention also relates to a manufacturing method for such a collimator, as well as a method for manufacturing a radiation detector.

11 Claims, 3 Drawing Sheets

US 8,536,552 B2

COLLIMATOR FOR A RADIATION DETECTOR AND METHOD FOR MANUFACTURING SUCH A COLLIMATOR AS WELL AS METHOD FOR MANUFACTURING A RADIATION DETECTOR COMPRISING COLLIMATORS

PRIORITY STATEMENT

The present application hereby claims priority under 35 U.S.C. §119 on German patent application number DE 10 2010 062 133.1 filed Nov. 29, 2010, the entire contents of which are hereby incorporated herein by reference.

FIELD

At least one embodiment of the invention generally relates to a collimator for a radiation detector and/or a method for manufacturing such a collimator and/or a method for manufacturing a radiation detector comprising collimators.

BACKGROUND

Scattered radiation essentially develops as a result of the interaction of a primary radiation, which originates from a focus of a beam source, with the object to be examined. On account of this interaction from a spatial direction which differs by comparison with the primary radiation, scattered radiation, which strikes a radiation converter of a radiation detector, causes artifacts in the reconstructed image Collimators are therefore arranged upstream of the radiation converters in order to reduce the detected portion of scattered radiation in the detector signals. Collimators of this type comprise absorber elements which are arranged one or two-dimensionally, the absorber surfaces of which are aligned radially toward the focus of a radiation source in the manner of a fan so that only radiation from a spatial direction which targets the focus is able to strike the radiation detector.

A slight tilt and/or misalignment of the collimator with respect to a radiation converter may already result in shadowing effects on the active regions of the radiation converter and thus in a falsification and/or reduction of the achievable signal-to-noise ratio. One particular challenge when configuring a radiation detector is therefore to align the collimator very precisely with respect to the radiation converter. Positioning accuracies in a range of a few 10 μm must be achievable here and must also be testable using measurement technology.

SUMMARY

At least one embodiment of the invention is therefore directed to specifying a collimator for a radiation detector and a method for manufacturing such a collimator, by which the requirements of a precise mounting of the collimator with respect to a radiation converter can be met. Furthermore, at least one embodiment specifies a method for configuring a radiation detector, with which a precise alignment of the collimators with respect to a radiation converter can be achieved.

At least one embodiment is directed to a collimator and/or a method for manufacturing a collimator. At least one embodiment is directed to a method for configuring a radiation detector. Advantageous embodiments and developments of the invention form the subject matter of the subclaims.

The collimator for a radiation detector of at least one embodiment comprises at least three spacing elements which are arranged on a radiation exit face of the collimator. They are used to mount the collimator in a stable fashion with respect to a radiation converter of the radiation detector.

At least one embodiment of the invention is based on the knowledge that a precise alignment of the collimator relative to the radiation converter is rendered more difficult by the radiation exit face of the collimator and a mounting surface provided to position the collimator on the radiation converter having manufacturing-related tolerances with respect to the planned surfaces provided in each instance. Deviations in the manufactured surfaces from the planned surfaces in the form of unevennesses regularly result in a direction of radiation incidence such that a precise positioning of the collimator is made more difficult or impossible. As a function of the local occurrence of such deviations, it may ensue that it is not possible to position the collimator in a stable fashion relative to the radiation converter. The risk of a misalignment of the collimator then increases during the fixing process as a result of tilting that occurs. Deviations may also intensify locally and result in the collimator tilting. Gaps of several 100 μm may therefore occur in the direction of radiation incidence between the radiation exit face and the mounting surface of the radiation converter when in an assembled state.

The inventors have recognized that the risk of a misalignment of the collimator in respect of the radiation converter can be reduced to a surprisingly great degree if at least three spacing elements are arranged on the radiation exit face of the collimator. The spacing elements are used to overcome unevennesses in the opposing surfaces during integration of the collimator. They are dimensioned here such that manufacturing-related deviations in the manufactured surfaces from the planned surfaces have no influence on the positioning of the collimator. The collimator is therefore positioned on the radiation converter therefore in a manner decoupled from any unevennesses in the radiation exit face of the collimator and the mounting surface of the radiation converter.

The spacing elements have an essentially smaller base area than the radiation exit face of the collimator. In order to ensure an exact alignment of the collimator, it is accordingly sufficient for only the spacing elements to be manufactured with high precision. When aligning the collimator above the spacing elements, the large-area radiation exit face of the collimator is able to be manufactured while accepting larger tolerances, which reduces the complexity of the manufacturing process and thus the manufacturing costs of this component by comparison with previous collimators.

A stable mounting without the risk of the collimator tilting is ensured in particular by way of this three-point mounting since all three degrees of freedom of a plane are already determined by the three feet. With rectangular or square base areas of the collimator, four spacing elements arranged on the radiation exit face are advantageous for simple and intuitive positioning on the radiation converter.

The spacing elements are preferably dimensioned according to a total of the maximum number of expected local manufacturing-related deviations of the radiation exit face and a mounting surface of the radiation converter from predetermined planned surfaces in the direction of radiation incidence. The risk of a misalignment of the collimator on account of manufacturing-related unevennesses in the surfaces is thus prevented, with existing gaps between the radiation converter and the collimator at the same time being kept as small as possible.

In an advantageous embodiment of the invention, the collimator with the spacing elements is embodied as a one-piece element. This simplifies in particular the manufacturing process. Here the spacing feet can be formed intrinsically from a component part of the collimator for instance.

A high positioning accuracy is required in particular in collimators for scattered radiation reduction, which are embodied in the φ- and z-direction as 2D collimators with a cell-type structure. The advantage achieved by the spacing elements is particularly high here. With these collimators, by comparison with the one-dimensional collimators, there is namely a higher risk of a shadowing effect of the active detector cell regions, since tilting of the absorber surface both in the φ- and also z-direction may produce shadowing effects.

The collimator is preferably manufactured according to a Rapid Manufacturing technique, preferably by way of a selective laser melting. The so-called Rapid Manufacturing technique is a rapid manufacturing method in which a component is built up layer by layer from powdery material using physical and/or chemical effects. With each manufacturing step, a new layer can be selectively, very precisely and thinly applied to the existing structure so that the absorber elements and the spacing elements can be manufactured with very high accuracy in terms of their width, height and position. The manufacturing takes place here based on layer data, which can be easily generated directly from 3D surface data, as exists in CAD systems. The spacing elements can herewith be realized as a single component with the collimator using a software-driven approach. At least one spacing element is therefore formed for instance preferably by at least one of the absorber elements projecting out of the radiation exit face of the collimator.

In an advantageous embodiment of the invention, the spacing elements are arranged in corner positions or on positions of edge bisectors of the radiation exit face of the collimator. This means that the plane of alignment spanned by the spacing elements comprises the largest possible surface. Tolerances during the manufacture of the spacing elements then only have a minimal effect on the alignment of the plane of alignment defined by the spacing elements.

As previously already mentioned, a collimator can be inventively manufactured with the described advantages by means of a method in which webs which cross over one another layer by layer are embodied from a radiation-absorbing material along a φ- and z-direction by way of a Rapid Manufacturing technique and in which at least three spacing elements are also embodied on the radiation exit face of the collimator, which are set up for the stable mounting of the collimator with respect to a radiation converter of the radiation detector. The spacing elements are preferably dimensioned here according to a total of the maximum number of expected manufacturing-related deviations of the radiation exit face and a mounting surface of the radiation converter from predetermined planned surfaces in the direction of radiation incidence.

The manufacture of the collimator using an injection molding method with plastics is similarly advantageous, said plastics being filled with or having an added x-ray absorbing powder. To produce the x-ray absorbing properties, the powder includes particles made from tungsten, molybdenum or alloys with portions of tungsten and/or molybdenum for instance. Methods of this type are conventionally available and can be implemented with little outlay.

The inventive method of at least one embodiment for manufacturing a radiation detector composed of detector modules includes at least the following:
a) Providing a radiation converter,
b) Providing at least one previously described inventive collimator,
c) Selectively or 2-dimensionally applying an adhesive onto the radiation exit face of the at least one collimator and/or onto a mounting surface of the radiation converter,
d) placing the at least one collimator with its spacing elements onto the radiation converter so as to form a detector tile,
e) repeating the steps a) to d) for a number of detector tiles,
f) assembling the detector tiles onto a module carrier,
g) repeating steps a) to f) for a predetermined number of detector modules, and
h) assembling the detector modules on a detector mechanics for forming the radiation detector.

BRIEF DESCRIPTION OF THE DRAWINGS

Example embodiments of the invention and further advantageous embodiments of the invention according to the subclaims are shown in the subsequent schematic drawings, in which;

DETAILED DESCRIPTION OF THE EXAMPLE EMBODIMENTS

Figure 1:
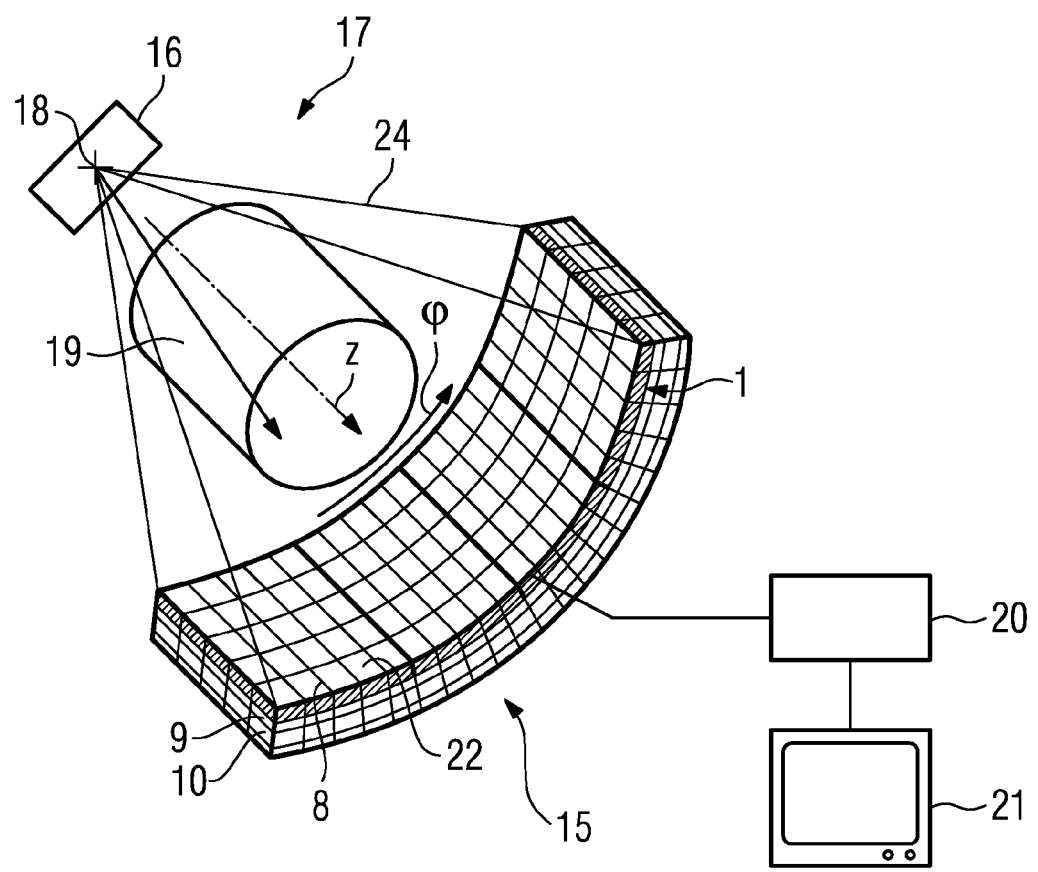
FIG. 1 shows a schematic representation of a computed tomography device.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Parts having the same functions are provided with the same reference characters in the figures. In the case of recurring elements in a figure, like for instance in the case of the detector elements 22, only one element is provided with a reference character in each instance for the sake of clarity. The representations in the figures are schematic and not necessarily true to scale, with scales possibly varying between the Figures.

A computed tomography device 17 is shown in FIG. 1, which includes a radiation source 16 in the form of an x-ray tube, from the focus 18 of which an x-ray radiation fan 24 originates. The x-ray radiation fan 24 penetrates an object 19 to be examined or a patient and strikes a radiation detector 15, here an x-ray detector.

The x-ray tube 16 and the x-ray detector 15 are arranged opposite one another on a gantry (not shown here) of the computer tomography device 17, which gantry can be rotated in an φ-direction about a system axis Z (=patient axis) of the computer tomography device 17. The φ-direction therefore represents the circumferential direction of the gantry and the z-direction the longitudinal direction of the object 19 to be examined.

During operation of the computed tomography device 17, the x-ray tubes 16 arranged on the gantry and the x-ray detector 15 rotate about the object 19, wherein x-ray recordings of the object 19 are obtained from different projection directions. X-ray radiation which passes through the object 19 and is weakened as a result strikes the x-ray detector 15 per x-ray projection. Here the x-ray detector 15 generates signals, which correspond to the intensity of the impacted x-ray radiation.

The conversion of x-ray radiation into electrical signals takes place by means of a radiation converter 9, 10, which is structured for the locally-resolved detection of x-ray radiation in individual detector elements 22. The signal generation takes place by means of a photodiode array 10, which is optically coupled to a scintillator array 9. From the signals detected using the x-ray detector 15, an evaluation unit 20 finally calculates in a manner known per se one or more two or three-dimensional images of the object 19, which can be displayed on a display unit 21.

The primary radiation originating from the focus 18 of the x-ray tube 16 is inter alia scattered in different spatial directions in the object 19. This so-called secondary radiation generates signals in the detector elements 22, which cannot be distinguished from the signals of a primary radiation which are needed for the image reconstruction. The secondary radiation would therefore result, without any further measures, in misinterpretations of the detected radiation and thus in a significant impairment of the images obtained using the computed tomography device 17.

To restrict the influence of the secondary radiation, with the aid of a collimator 1, essentially only the portion of x-ray radiation originating from the focus 18, in other words the primary radiation portion, is allowed to pass unhindered onto the radiation converter 9, 10, while the secondary radiation is ideally completely absorbed by the absorber surfaces of the absorber elements 8.

Figure 2:
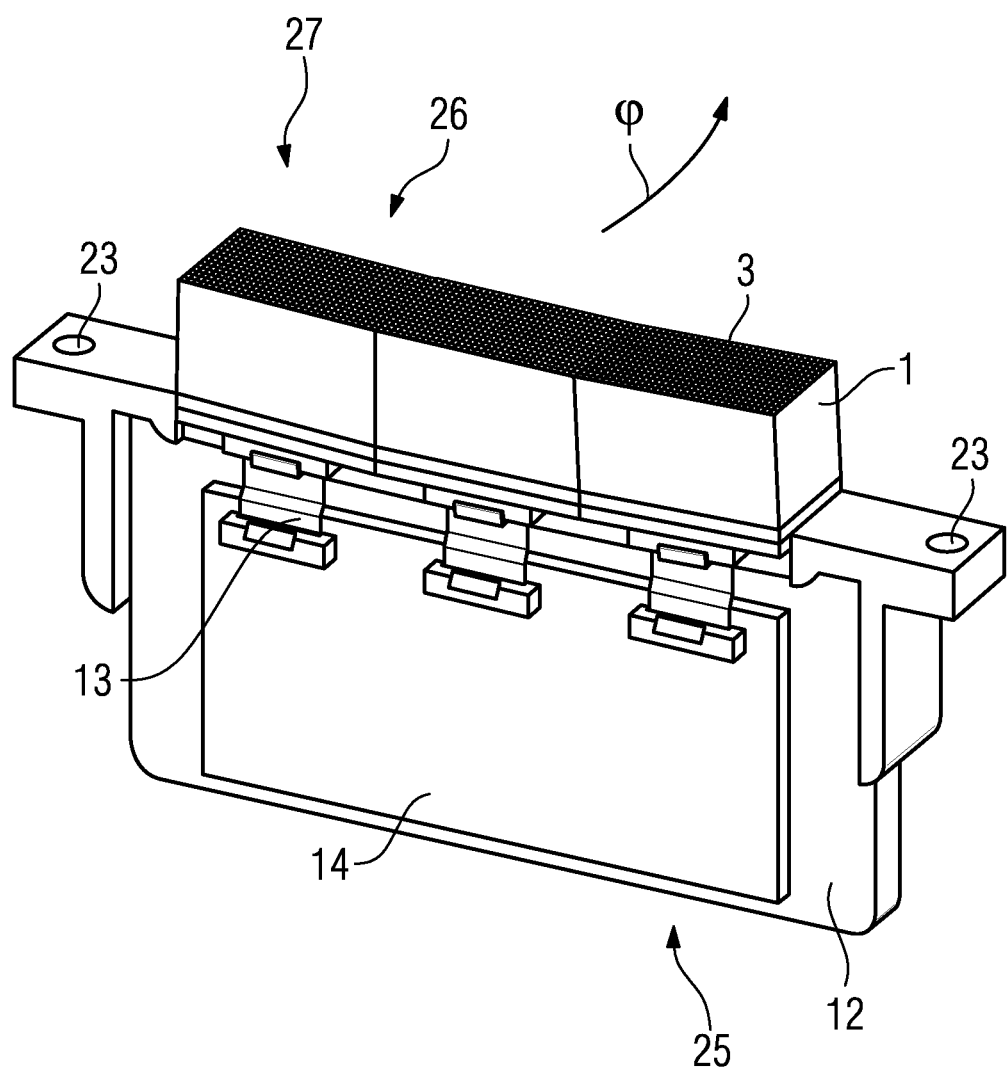
FIG. 2 shows a perspective side view of a detector module with three detector tiles.

The x-ray detector 15 is subdivided into individual detector modules 25, one of which can be seen in a perspective view in FIG. 2. In order to construct the x-ray detector 15 in the φ-direction, the detector modules 25 are mechanically coupled to a detector mechanics via laterally arranged drilled holes 23 by way of screw connections. Each detector module 25 is in turn subdivided into individual detector tiles 26, which are arranged linearly adjacent to one another in the x-direction in this exemplary embodiment. The detector tiles 26 are mechanically fixed to a module carrier 12 by way of screw and/or adhesive connections. The electrical connection of the individual detector tiles 26 to a module backplane 14 and/or to a module circuit board 14 of the module carrier 12 is made by way of a flexible cable 13, which is connected to the respective detector tile 26 by way of a plug 11. In order to convert the x-ray radiation into electrical signals, each detector tile 26 comprises a radiation converter 9, 10 with a photodiode array 10 and a scintillator array 9, and an inventive collimator 1 in order to reduce scattered radiation.

Figure 3:
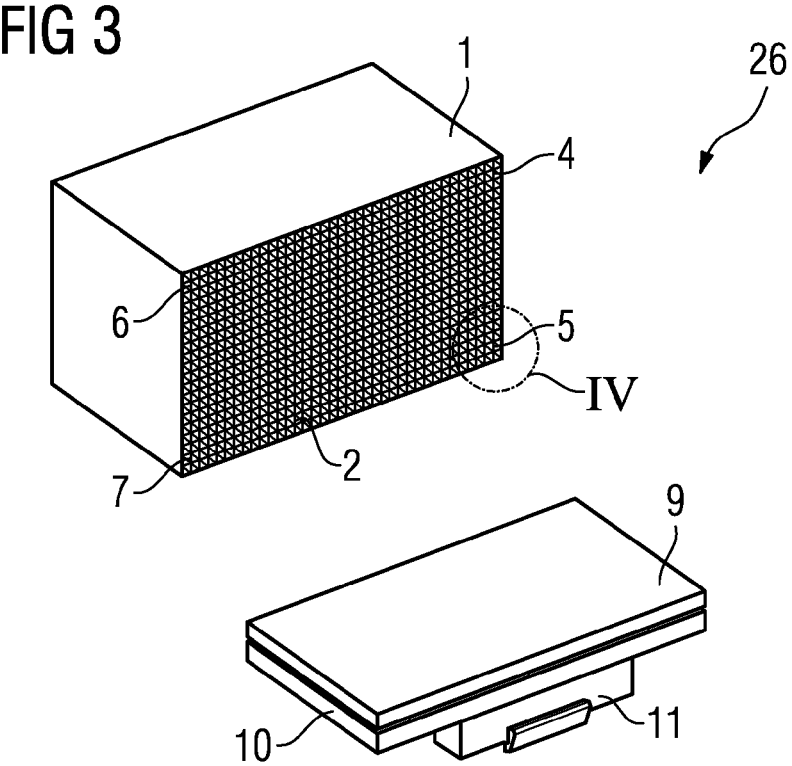
FIG. 3 shows an exploded representation of a detector tile having an embodiment of an inventive collimator and FIG. 4 shows a cutout of the collimator shown in FIG. 3 in the region of a spacing element.

Such a detector tile 26 is shown in more detail in an exploded representation in FIG. 3. The collimator 1 comprises four spacing elements 4, 5, 6, 7 and/or spacing feet for its exact alignment with respect to the radiation converter 9, 10. The spacing feet 4, 5, 6, 7 are arranged on the radiation exit face 2 in the four corner positions of the rectangular base area of the collimator 1. In principle, they can however be positioned at any positions on the radiation exit face 2, for instance on the position of edge-bisectors of the base area formed on the radiation exit face 2. They project here from the base surface and are dimensioned such that an unstable or faulty mounting of the collimator 1 in the event of curving or manufacturing-related unevennesses of the radiation exit face 2 of the collimator or of the surface of the radiation converter 9, 10 and/or of the scintillator array 9 is largely reduced. The outlay involved in the alignment and/or adjustment of the collimator when being fixed to the radiation converter 9, 10 is herewith reduced by means of an adhesive. Epoxy adhesives are considered as adhesives for instance. The adhesive layer is either applied to the radiation exit face 2 selectively or 2-dimensionally. Additionally or as an alternative, the application of the adhesive to the radiation entry side of the radiation converter 9, 10 would also be conceivable. The adhesive layer thickness is selected here such that possible gaps between the collimator 1 and the radiation converter 9, 10 are closed.

Reference is made here to the segmentation of the radiation detector 15 in the detector module 25 and the segmentation of the respective detector module 25 in individual detector tiles 25 in principal being left out and being selectable in accordance with an efficient manufacture or integration. Furthermore, the segmentation of the collimator 1 can also be freely selected. Depending on accuracy demands, the outlay in the manufacturing process and in the adjustment, it may be advantageous for the collimators 1 to span the whole radiation detector 15 or in another extreme case, to only cover part of a detector tile 26.

Figure 4:
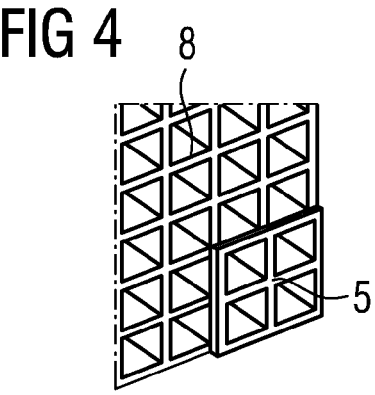

FIG. 4 shows a detailed view of a part of the collimator 1 which is surrounded by a circle in FIG. 3 in the region of a spacing element 5. In this concrete example embodiment, the spacing element 5 is an integral part of part of the absorber element 8. The spacing element 5 is thus formed such that the absorber elements 8 project from four collimator cells arranged in the corner region of the collimator 1 with respect to the remaining absorber elements 8 from the base surface. The collimator 1 with the absorber elements 8 and with the spacing elements 5 can be manufactured in just one process step by means of a Rapid Manufacturing technique for instance.

A method for the selective laser melting, (SLM) is considered for instance. With this technique, the 2D collimator is structured three-dimensionally in accordance with the layer construction principle by way of illuminating individual layers with a laser, for instance with a fiber laser, which comprises a laser output of approximately 100 to 1000 Watt. Tungsten, molybdenum or an alloy having portions of tungsten and/or molybdenum can be used as material in the laser melting method.

The good focusing ability of the laser radiation enables the laser sintering process to be selectively restricted to small surfaces so that spacing elements 4, 5, 6, 7 can be structured with small base areas. The base area of the spacing elements 4, 5, 6, 7 extends in this concrete exemplary embodiment across four detector elements 22. They can naturally also be restricted to just one or less than one detector element 22. The height of the spacing elements 4, 5, 6, 7 from the radiation exit face 2 of the collimator 1 typically lies in a range between 50 μm to 300 μm.

On account of the possibility of a rapid deflection of a laser beam, the manufacturing time can be significantly reduced compared with the known manufacturing method, in which polymer compounds are cured. It would however also be conceivable to manufacture the spacing elements 4, 5, 6, 6 intrinsically by means of a sawing process. Similarly such spacing elements 4, 5, 6, 7 are also advantageous in collimators 1, which are only used for the one-dimensional collimation 1 of radiation.

IN SUMMARY

An embodiment of the invention relates to a collimator 1 for a radiation detector 15 having at least three spacing elements 4, 5, 6, 7 arranged on a radiation exit face 2 of the collimator (1). They are embodied so as to mount the collimator 1 in a stable manner with respect to a radiation converter 9, 10 of the radiation detector 15. The at least three spacing elements 4, 5, 6, 7 enable a very precise and stable alignment of the collimator 1 in respect of the radiation converter 9, 10 despite manufacturing-related curves or unevennesses in the radiation exit face 2 and/or the mounting surface on the part of the radiation converter 9, 10.

An embodiment of the invention also relates to a manufacturing method for such a collimator 1 as well as a method for manufacturing a radiation detector 15.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A collimator for a radiation detector including at least three spacing elements arranged on a radiation exit face of the collimator; wherein the collimator, for scattered radiation reduction in a $\phi$- and in z-direction, is embodied as a 2D collimator with a cell-type structure; and wherein the collimator is manufactured by way of a selective laser melting or by way of an injection molding method with plastic, which is manufactured with an x-ray absorbing powder.

2. The collimator as claimed in claim 1, wherein the spacing elements in the direction of radiation incidence are dimensioned according to a total of a maximum number of expected manufacturing-related deviations of the radiation exit face and of a support surface of a radiation converter of the radiation detector from planned surfaces.

3. The collimator as claimed in claim 2, wherein the collimator with the spacing elements is a one-piece element.

4. The collimator as claimed in claim 2, wherein the spacing elements are arranged in corner positions or on positions of edge bisectors of the radiation exit face of the collimator.

5. The collimator as claimed in claim 2, wherein at least one spacing element is formed by at least one absorber element projecting out of the radiation exit face of the collimator.

6. The collimator as claimed in claim 1, wherein the collimator with the spacing elements is a one-piece element.

7. The collimator as claimed in claim 1, wherein the collimator is manufactured by way of a Rapid Manufacturing technique.

8. The collimator as claimed in claim 1, wherein the spacing elements are arranged in corner positions or on positions of edge bisectors of the radiation exit face of the collimator.

9. The collimator as claimed in claim 1, wherein at least one spacing element is formed by at least one absorber element projecting out of the radiation exit face of the collimator.

10. A method for manufacturing a collimator for a radiation detector, the method comprising:
embodying absorber elements, crossing over each other, layer by layer from a radiation-absorbing material along a $\phi$- and z-direction by way of a Rapid Manufacturing technique or by way of an injection molding method using plastic, which is filled with an x-ray absorbing powder, and wherein at least three spacing elements are embodied in addition on a radiation exit face of the collimator.

11. The method as claimed in claim 10, wherein the spacing elements are dimensioned according to a total of the maximum number of expected manufacturing-related deviations of the radiation exit face and of a mounting surface of a radiation converter of the radiation detector from planned surfaces in the direction of radiation incidence.

* * * * *